July 16, 1963 — A. KONRAD — 3,097,467

POWER MOWER WITH ROTARY AND VIBRATORY CLEANING DISC

Filed Aug. 15, 1962

INVENTOR
ALEXANDER KONRAD
BY Kimmel & Crowell
ATTORNEY

3,097,467
POWER MOWER WITH ROTARY AND VIBRATORY CLEANING DISC

Alexander Konrad, Parma, Ohio, assignor of twenty percent each to Lucille L. Hahn, Parma Heights, Ohio, Mrs. Margaret J. Konrad, Parma, Ohio, Mrs. Marsha B. Felder, Parma, Ohio, and Warren A. Konrad, Parma, Ohio
Filed Aug. 15, 1962, Ser. No. 217,106
6 Claims. (Cl. 56—25.4)

This invention relates to a rotary power mower and has as its primary object the provision of an improved rotary power mower characterized by a free floating saucer type or cup-shaped disc positioned on the drive shaft of the motor above the cutter blade having the primary purpose of distributing the mown grass or the like at peripheral points about the cutter to preclude grass accumulation in the cutter chamber of the mower.

An additional object of the invention is the provision of a disc or saucer of this type in association with a power mower which is surrounded by a peripheral depending flange which drops below the level of the cutter blade thus providing an improved safety factor in preventing the introduction of a toe or finger to direct contact with the blade.

An additional object of the invention is the provision of such a disc or saucer which is loosely mounted beneath the exhaust, whereby the discharge of the exhaust on the disc will impart vibration thereto which will further enhance the distribution of the mown or cut grass.

An additional object of the invention is the provision of a solid or imperforate disc of this character which also acts as a muffler serving to reduce the noise of the mower.

Still another object of the invention is the provision of a mower characterized by a disc of this type which will enhance the ability of the power mower to cut wet grass, since clogging of the chamber by wet grass is substantially precluded by the disc.

A further object of the invention is the provision of a disc of this character which will discharge mown grass around the entire circumference of the chamber, rather than through a single opening as is customarily the case with present mowers, and thus preclude ridging or packing of the mown grass on the lawn after it is cut.

Still another object of the invention is the provision of a device of this character which is radially corrugated and which, due to its free floating mounting on the drive shaft, will cause resistance to air and grass currents imparted from the cutter blade, causing it to spin faster.

Still another object of the invention is the provision of a disc of this character wherein the taper from the flat portion of the depending or saucer type flange is gradual, thus enhancing the safety characteristics of the device.

An additional object of the invention is the provision of such a saucer provided with blunt serrated edges below the cutter blade level serving as a warning or danger signal to preclude the insertion of fingers or toes into the path of the blade.

A further object of the invention is the provision of a saucer edge of this character whereby in the rotation thereof small material such as stones or the like would be deflected from the cutter blade in operation.

Still another object of the invention is the provision of a device of this character wherein the disc or saucer serves as a distributor for weed killer, fertilizer, or similar liquid substance, when the liquid is suspended above the disc.

Still other objects reside in the combinations of elements, arrangements of parts, and features of construction, all as will be more fully pointed out hereinafter and disclosed in the accompanying drawing wherein there is shown a preferred embodiment of this inventive concept.

Figure 1:
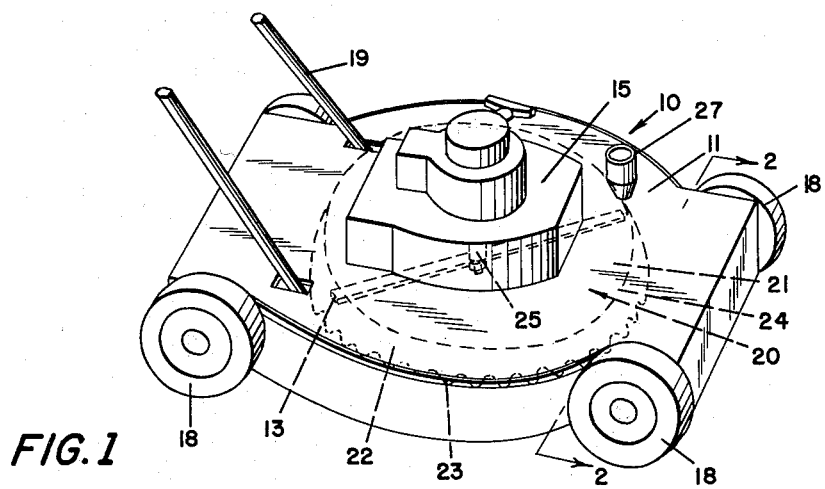
FIGURE 1 is a perspective view of one form of power mower showing the disc or saucer of the instant invention in position therein, the latter being indicated in dotted lines.

Having reference now to the drawings in detail, there is generally at 10 a power mower of substantially conventional type including a mower casing 11, which forms an internal chamber 12 within which is rotatable a double bladed cutter 13. The blade 13 is mounted on the drive shaft 14 of a conventional motor 15, which is positioned on the top of the casing 11, the mounting of the blade including the usual washer 16 and a lock nut 17. The assembly is mounted on wheels 18, and is provided with the usual pivoted handle 19 for guidance and direction.

The instant inventive concept includes a disc or saucer generally indicated at 20, which includes a central disc portion 21, of a diameter in excess of the length of the cutting blade 13, and which is provided with a depending annular flange 22 which is provided about its lower edge with blunt serrations 23. Disc 21 merges into flange 22 by means of a gently curved rounded annular shoulder 24, the arrangement being such that there are no sharp edges on the disc, and that the serrated lower flange edge 23 depends well below the ends of the blade 13. Disc 21 is provided with a central opening in which is fixed an annular sleeve 25, which surrounds drive shaft 14, and is free floating thereon.

If desired, the upper surface 21 of disc 20 may be radially corrugated as at 29 to impart additional strength thereto, and also to increase frictional resistance to air current, and consequent vibration and rotation of the disc when in operation.

If desired, the sleeve 25 may be loosely affixed in the center of disc 21, or alternatively may be of a diameter slightly in excess of that of drive shaft 14 in order to permit additional vibration. With such a construction the disc 21 may rock about its mounting on the drive shaft 14 as it rotates thereabout.

Figure 2:
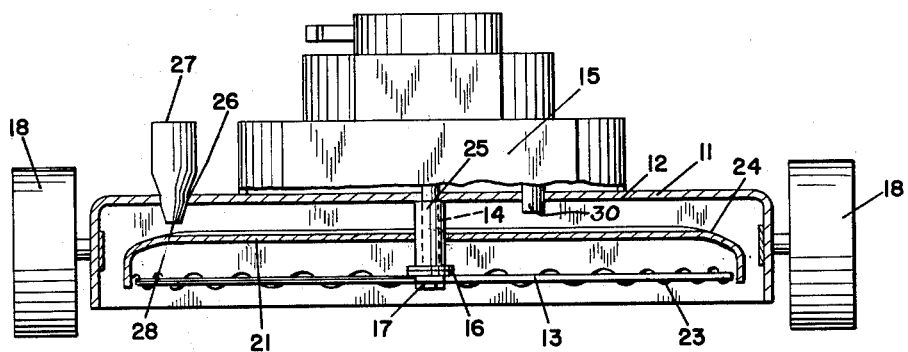
FIGURE 2 is an enlarged sectional view taken substantially along the line 2—2 of FIGURE 1 as viewed in the direction indicated by the arrows.
Figure 3:
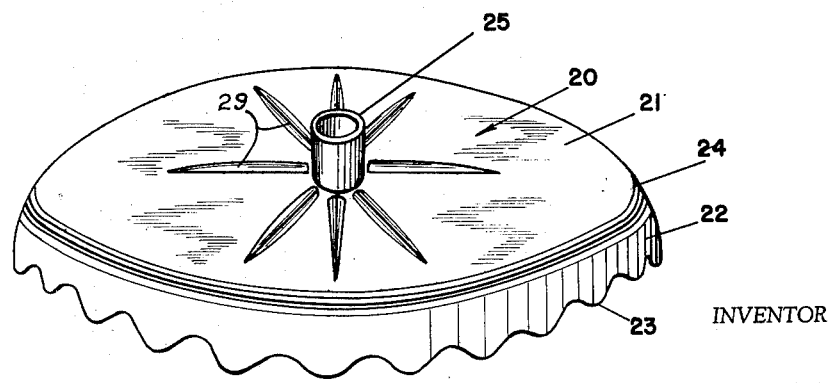
FIGURE 3 is a perspective view of the saucer or disc comprising an element of the instant invention shown as disassociated from the mower.

As shown particularly in FIGURE 2 the disc 21 is mounted beneath the exhaust 30 from the motor 15, whereby the discharge of the exhaust 30 on the disc 21 will impart additional vibration thereto and rotation thereof, particularly if the latter is corrugated as at 29, which will further enhance the distribution of the mown or cut grass. The vibration will be increased if the sleeve 25 is loosely mounted with respect to the drive shaft 14 as explained hereinabove.

If desired, the top surface of casing or housing 11 may be provided with an opening 26 in which a bottle of weed killer, insecticide or fertilizer may be inserted with its opening 28 extending immediately above the peripheral edge of disc 21 adjacent shoulder 24, so that the disc may, by centrifugal force, disseminate the insecticide, weed killer, or other liquid contained in the bottle 27.

From the foregoing it will now be seen that there is herein provided an improved rotary power mower characterized by a free floating disc or saucer which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. In a rotary power mower including a casing having an internal chamber, wheels mounting said casing, a motor having an exhaust and being mounted on said casing, a drive shaft extending vertically from said motor through said casing, and a rotary cutter blade on said drive shaft, the improvement which comprises a rotatable disc loosely mounted on said drive shaft above said blade for independent rotation thereof and for vibration with respect thereto.

2. A structure in accordance with claim 1 wherein said disc is radially corrugated.

3. A structure in accordance with claim 2 wherein said exhaust includes an opening discharging downwardly against the upper surface of said disc.

4. A structure in accordance with claim 1 wherein said disc is of a diameter in excess of the length of said blade and has an annular flange depending below said blade.

5. A structure in accordance with claim 4 wherein the lower edge of said annular flange is formed with blunt serrations.

6. A structure in accordance with claim 1 wherein said casing has an opening defined in the top thereof, and a bottle of liquid supported within said opening having an open lower end adjacent the peripheral edge of said disc whereby the liquid within said bottle is disseminated thereby.

References Cited in the file of this patent

UNITED STATES PATENTS

| | | |
|---|---|---|
| 2,663,984 | Clark | Dec. 29, 1953 |
| 2,832,184 | Beuerle | Apr. 29, 1958 |
| 2,854,807 | Byler et al. | Oct. 7, 1958 |
| 2,888,796 | Denney | June 2, 1959 |
| 2,939,636 | Mullin | June 7, 1960 |
| 2,966,023 | Carpenter | Dec. 27, 1960 |
| 3,008,283 | Wood | Nov. 14, 1961 |